(12) United States Patent
Kato

(10) Patent No.: US 8,751,065 B1
(45) Date of Patent: Jun. 10, 2014

(54) SMARTPHONE CONTROLLER OF VEHICLE SETTINGS

(71) Applicant: Denso Corporation, Kariya (JP)

(72) Inventor: Kenji Kato, Novi, MI (US)

(73) Assignee: Denso Corporation, Kariya (JP)

( * ) Notice: Subject to any disclaimer, the term of this patent is extended or adjusted under 35 U.S.C. 154(b) by 45 days.

(21) Appl. No.: 13/714,690

(22) Filed: Dec. 14, 2012

(51) Int. Cl.
*G05D 1/00* (2006.01)

(52) U.S. Cl.
USPC ......... 701/2; 701/36; 340/426.2; 340/426.13; 340/426.36

(58) Field of Classification Search
USPC ......... 701/2, 36, 49, 86; 455/39, 41.2, 73, 96; 340/426.12, 426.13, 426.2, 426.28, 340/426.36, 426.35, 4.62, 5.2, 5.8
See application file for complete search history.

(56) References Cited

U.S. PATENT DOCUMENTS

| | | | |
|---|---|---|---|
| 6,522,029 B1 * | 2/2003 | Bell et al. | 307/10.6 |
| 8,335,502 B2 * | 12/2012 | Oesterling et al. | 455/419 |
| 2006/0061458 A1 | 3/2006 | Simon et al. | |
| 2008/0024296 A1 | 1/2008 | Jeong | |
| 2008/0125029 A1 | 5/2008 | Kernan | |
| 2008/0272889 A1 | 11/2008 | Symons | |
| 2009/0278656 A1 * | 11/2009 | Lopez et al. | 340/5.72 |
| 2010/0222939 A1 | 9/2010 | Namburu et al. | |
| 2011/0112969 A1 | 5/2011 | Zaid et al. | |

FOREIGN PATENT DOCUMENTS

EP   1884415 A1   6/2008

OTHER PUBLICATIONS

International Search Report issued Feb. 20, 2014 in corresponding PCT Application No. PCT/JP/2013/006035.

* cited by examiner

*Primary Examiner* — Gertrude Arthur Jeanglaude

(57) ABSTRACT

A vehicle control system that contains a control module configured to wirelessly communicate with a mobile device to upload and download user specific settings that may be stored on the mobile device. The mobile device may also be configured to enable the ignition system once the vehicle authenticates the mobile device and remote keyless entry system. The memory of the mobile device is read and write capable, allowing for data to be used by the control module in conjunction with several automobile systems, and allowing for data to be transferred from said systems to the portable memory device by the control module, thus facilitating vehicle operation.

20 Claims, 7 Drawing Sheets

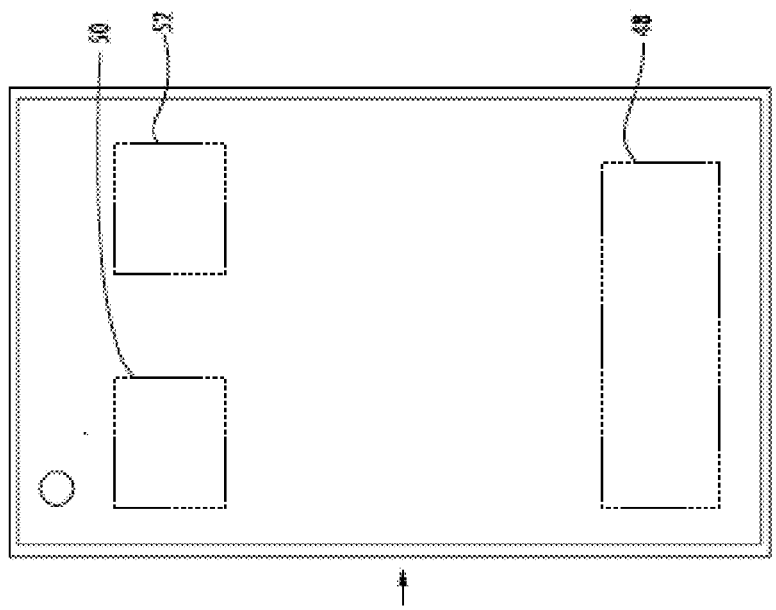
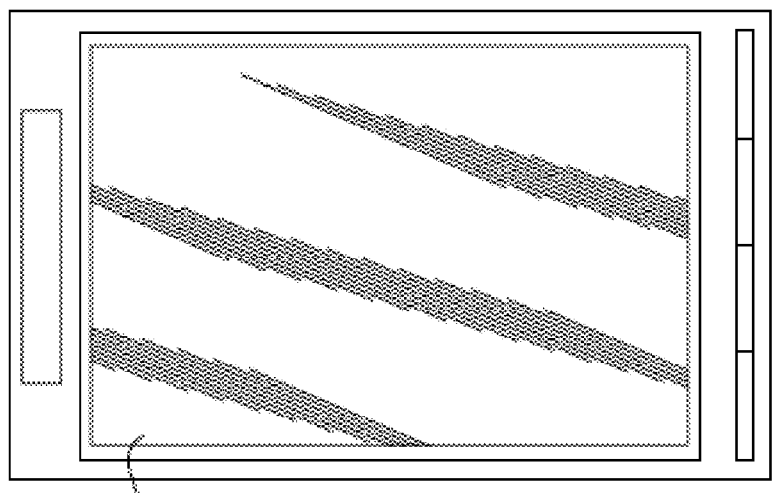
FIG. 3B
FIG. 3A

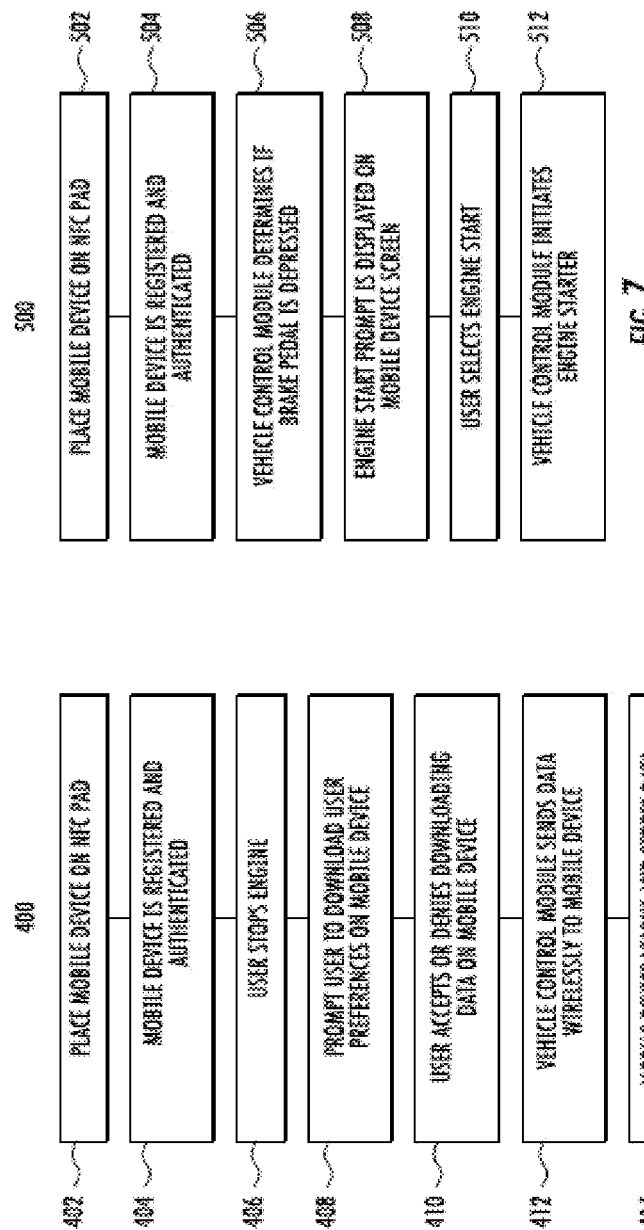

SMARTPHONE CONTROLLER OF VEHICLE SETTINGS

FIELD

This present invention relates to the field of smartphones interfacing and communicating with a desired vehicle, more specifically this invention relates a smartphone storing specific user settings, communicating that to a vehicle and providing an interface to control the vehicle using the smartphone.

BACKGROUND

The world of smartphone technology is changing and innovating rapidly every day. Not only is device computing power and memory increasing exponentially, access to the Internet is now, for all practical purposes, omnipresent. If a Wi-Fi hotspot is not within range, a cell tower usually is. Recent developments with the "cloud" technology have made smartphones an infinite resource for both personalized storage and computing power.

Automobiles have devices that are personalized for the comfort, convenience, and safety of the vehicle occupant. Examples of vehicle devices that can be personalized include a seat having an adjustable seat position, a mirror having an adjustable position, and a climate control system having various preferred settings such as a preferred temperature; however these features are stored in the vehicle and not truly personalized to a specific user.

Modern vehicles are also equipped with remote keyless entry (RKE) systems and have been available for many years. A key fob is equipped with pushbuttons that, when depressed, cause a RKE transmitter in the key fob to transmit a short range signal to the RKE system in the vehicle which validates the signal and decodes the particular vehicle function to be executed while sending a signal to the particular vehicle system to effect the desired function control.

Generally, a key fob allows the user to lock and unlock the vehicle doors, open the vehicle trunk, and sound a vehicle alarm or horn in an emergency. Recent trends in remote vehicle access and control continue to expand beyond the basic short-range, unidirectional remote keyless entry systems toward longer range, bidirectional communication systems or smart fobs, which have many features, including vehicle access, keyless engine start and communication with a smartphone.

It would be desirable to provide an enhanced vehicle control system which provides an interface to a user's portable devices, such as cellular phones, smartphones, and tablet computers, etc. that is authenticated with a vehicles specific key fob.

SUMMARY

In the preferred embodiment, the vehicle operation system of a vehicle, utilizes a control module that can electronically communicate to all features and electronic components of the vehicle. The control module is connected to a transponder to wirelessly transmit and receive data. The vehicle control module is also connected to the remote keyless entry system which has an antenna that wirelessly communicates with a key fob. Additionally, a mobile device that contains memory and also an antenna to send and receive data may be able to communicate with the vehicle control module wirelessly. The vehicle control module is connected to the ignition system that is used to start and stop the engine of the vehicle. The mobile device is configured to communicate with the control module and the control module allows the mobile device, once authenticated with the key fob, to control the ignition system. The vehicle also contains a near field communication pad; this pad can wirelessly charge the battery of the mobile device. The vehicle may also contain adjustable features, such as a driver seat, a passenger seat, a HVAC system, a infotainment system, a brake pedal, an accelerator pedal, a side view mirror, all of which are connected to the control module. The vehicle control module wirelessly communicates the user settings of the adjustable features to the mobile device and the settings may be stored in the mobile device memory when the vehicle shuts off. The mobile device then can send the saved data to the vehicle control module once the user starts the vehicle, and the vehicle control module will prompt the adjustable components to conform to the saved user settings. The wireless transmission between the mobile device and the vehicle control module can be of near field communication or blue tooth.

DRAWINGS

The drawings described herein are for illustrative purposes only of selected embodiments and not all possible implementations, and are not intended to limit the scope of the present disclosure.

FIG. 3A is a front view of a mobile device;

FIG. 3B is a rear view of the mobile device;

FIG. 6 is a flowchart of the operation of the system;

FIG. 7 is a flowchart of the operation of the system;

Corresponding reference numerals indicate corresponding parts throughout the several views of the drawings.

DETAILED DESCRIPTION

Figure 1:
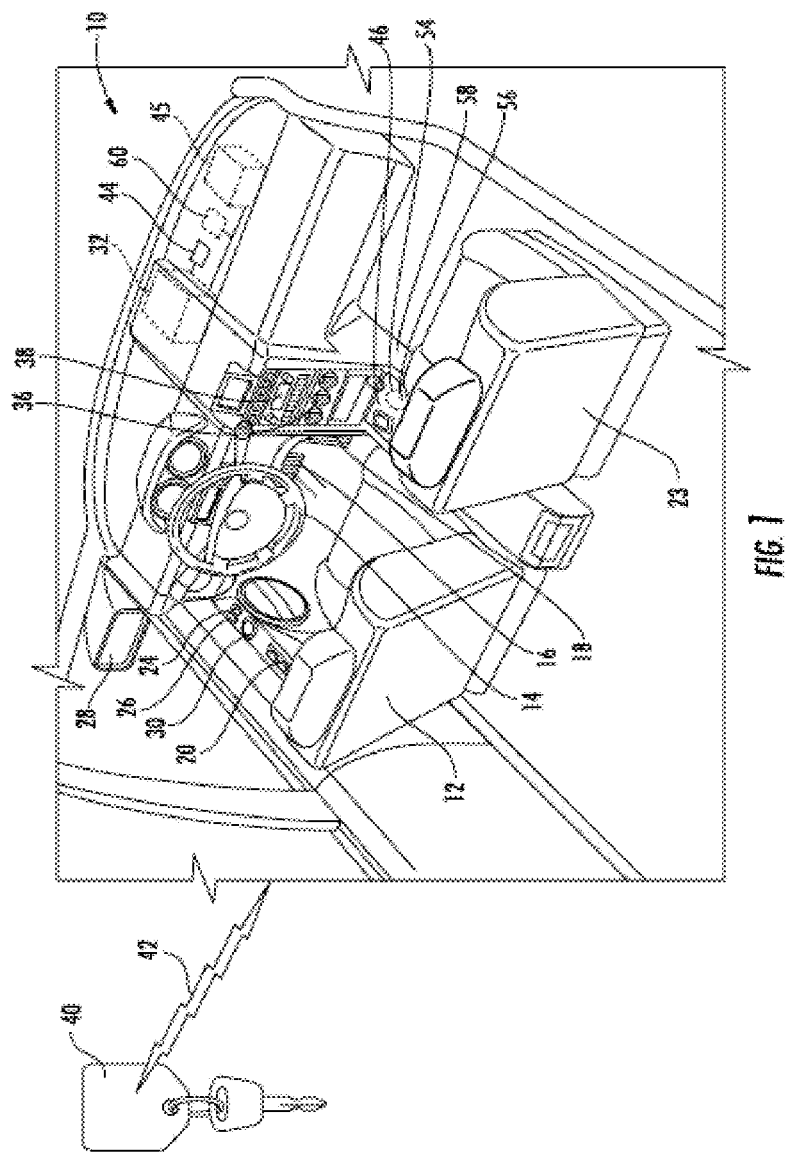
FIG. 1 is a fragmented perspective view of an automotive vehicle showing a portion of the passenger space.

Example embodiments will now be described more fully with reference to the accompanying drawings. The following description is merely exemplary in nature and is not intended to limit the present disclosure, application, or uses. It should be understood that throughout the drawings, corresponding reference numerals indicate like or corresponding parts and features.

Referring to FIG. 1 shows an interior of a vehicle 10. The vehicle 10 has a number of devices including a driver's seat 12 for the driver of the vehicle 10 to occupy; a steering wheel 14 for controlling the direction of the vehicle when the vehicle is moving, a brake pedal 16 for decelerating or stopping the vehicle, and an accelerator pedal 18 for accelerating the vehicle. The driver's seat 12 has an adjustable position so the position of the seat 12 within the interior can be adjusted in accordance with a preference of the user. The position of seat 12 may be adjusted using a seat position control 20. The adjustable aspect of the seat may include moving the seat forward, back, up, down, or tilting the backrest portion of the seat. The passenger seat 23 also contains an adjustable position so the position of the seat can be adjusted in accordance with a preference of a passenger of the vehicle. The steering wheel 14 may have an adjustable position so the position of the steering wheel can be adjusted in accordance with a preference of the user. If adjustable, the position of steering wheel 14 may be adjusted using a steering wheel position control 24. The adjustable aspect of the steering wheel may include tilting the steering wheel up or down, or telescoping the steering wheel in or out. The brake pedal 16 and accelerator pedal 18 may have adjustable positions so the distance from the user to the pedals can be adjusted in accordance with a preference of the user. If adjustable, the position of the pedals may be adjusted using a pedal position control 26. The adjustable aspect of the pedals may be to move the pedals closer to or further from the seat 12. The vehicle 10 also has a mirror 28 to assist the user in observing an area alongside or behind the vehicle. The mirror 28 has an adjustable position so the area observed can be adjusted in accordance with a preference of the user. The position of the mirror 28 may be adjusted using a mirror position control 30.

Figure 2:
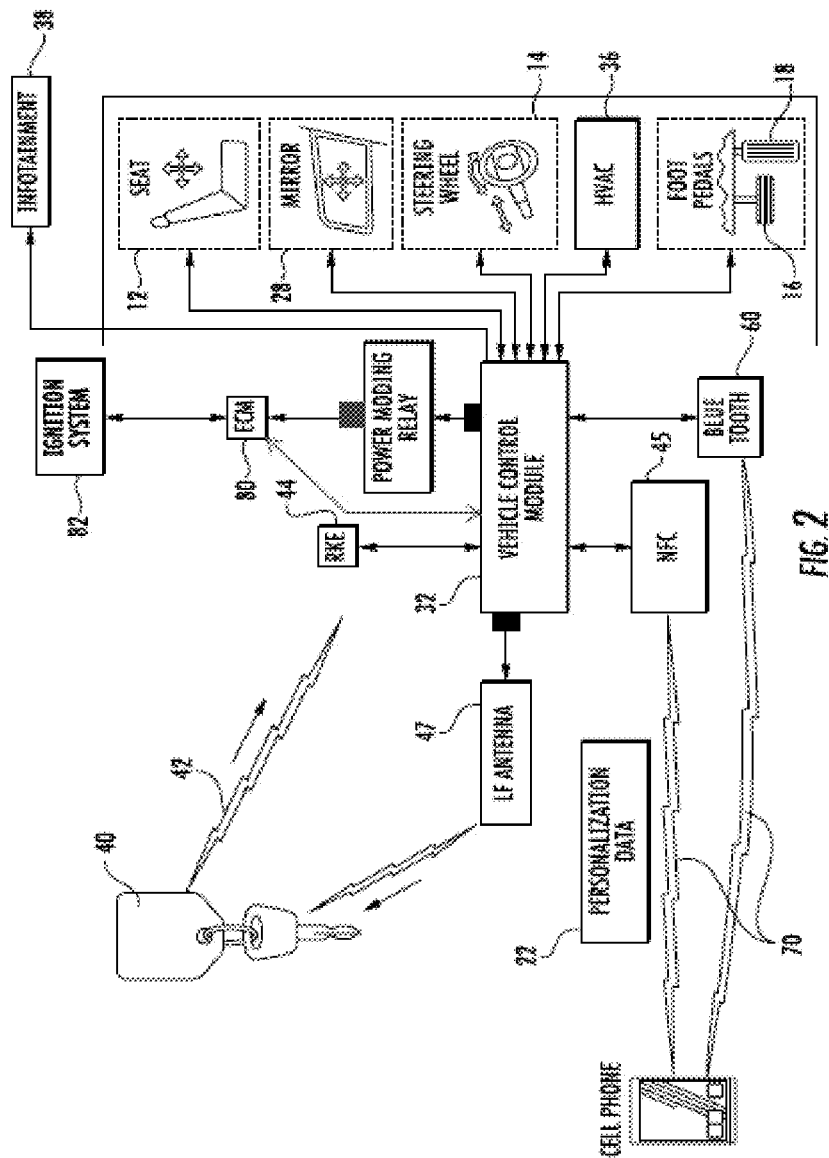
FIG. 2 is block diagram of the electronic communication.

As shown in FIG. 3, the vehicle 10 also has a vehicle control module 32 coupled to one or more of the adjustable vehicle devices such as the seat 12, the steering wheel 14, the brake pedal 16, the accelerator pedal 18, and the mirror 28, as illustrated in FIG. 2. The vehicle control module 32 may include several interconnected components such as a memory component, a logic component, and an input/output component, or the control module 32 may be a commercially available single-chip microprocessor. The coupling may be provided by individual wires between the control module 32 and each vehicle device, or may be provided by a shared communications bus, or local interconnect protocol, or controller area network, as a non-limiting example. The control module 32 is adapted to adjust or personalize the one or more of the adjustable vehicle devices in accordance with personalization data 22 received by the control module 32. The vehicle may further have a heating/ventilation/air conditioning (HVAC) system operated using a HVAC control 36 that includes a cabin temperature setting for assisting the user with controlling the temperature of the vehicle interior. Also an entertainment or infotainment system having an entertainment control 38 for adjusting an entertainment setting such as a preferred broadcasting station. The user may adjust these systems manually through the controls coupled to the respective systems. The control module 32 may be coupled to the HVAC system or the entertainment system and the personalization data 22 may include corresponding personal preferences for the cabin temperature setting and the entertainment setting.

The vehicle may also be equipped a remote keyless entry (RKE) system. The RKE system authenticates portable units 40 also known as key fobs or smart keys, and performs a door lock control, a door unlock control, an engine starting control and the like based on an authentication result. Specifically, the authentication of the key fob 40 is performed by transmitting radio waves 42 from the key fob 40 to antennas 44, which is disposed inside the vehicle and connected to the vehicle control module 32 which determines authenticates the key fob 40 and also determines what function to perform based on user input. It is appreciated in the art that the RKE system can be an active system or passive system, known in the art as Passive Entry Passive Start system (PEPS). The active system requires a user input to unlock, lock or start vehicle, wherein a passive system is based on proximity and the unlock function will perform automatically when the vehicle user is close to the vehicle. The PEPS system functions similar to the standard RKE system, but upon authentication of the key fob 40, the vehicle control module, through a low frequency (LF) antenna 47, may send a authentication signal to the key fob 40. It can also be appreciated that the PEPS system allows the user to start the vehicle by push bottom, rather than inserting a key into the ignition and turning it to start the vehicle. The key fob 40 is authenticated wirelessly, and the vehicle control module allows for the user input push starting the vehicle.

FIG. 1 additionally shows a mobile device 46, which may be a cell phone or smart phone, or tablet by way of non-liming example, that is shown in more detail in FIG. 3. The mobile device 46 has an internal memory device 48 for storing the personalization data 22 of a user for a vehicle device, and a near field communications (NFC) transponder 50 coupled to the memory and configured to transmit the personalization data 22. The cell phone also contains a battery to provide power to the cell phone while mobile (not shown). An NFC transponder is a known, commercially available, short-range wireless communication transponder that communicates with another NFC transponder for transferring data. The communications range between NFC transponders is normally less than one meter and sometimes limited to less than a few centimeters. The mobile device may also contain a blue tooth transceiver 52 for communication by blue tooth.

Referring to FIG. 1, the vehicle 10 includes a NFC transponder 54 incorporated in what is known in the art as a NFC pad 56, which is located in the center console 58 of the vehicle 10. It is understood in the art that the NFC pad 56 not only can be a location for a mobile device to communicate wirelessly through NFC transponders; it also can charge a mobile devices battery wirelessly through inductance, by way of a non-limiting example. It is also known in the art that a cell phone may also be equipped with a blue tooth transceiver 52. The blue tooth transceiver 52 can wireless communicate with a hands free device that can be placed in a user's ear (not shown), it can also communicate with a corresponding blue tooth module 60 in the vehicle 10 that would allow the user to use the mobile device 46 functions through a hands free speakerphone function in the vehicle (not shown). The blue tooth module 60 in the vehicle 10 is configured to transmit and receive data. The blue tooth wireless communication may also allow another mode of wireless personalized data 22 communication with the vehicle 10. The current embodiment allows for key fob 40, and once registered, the mobile device 46 to be authenticated allowing for the downloading of personalized data from the mobile device 46 to vehicle 10, and allow some features of the vehicle to initiated by indicating the function on the cellphone, like starting the engine by way of non-limiting example.

As shown in FIG. 2, is a block diagram of the communication between the vehicles control module 32 which may be configured to authenticate key fob 40 and to receive the personalization data 22 from the authenticated mobile device 46 either by NFC or blue tooth communication, whereby personalization data 22 is downloaded from the mobile device 46 to the vehicle 10. As used herein, downloading of personalization data 22 includes when the personalization data is recalled from the memory 48 (as shown in FIG. 3), it is then transmitted by either the NFC 50 or blue tooth transceiver 52, and received by the vehicle 10 NFC transponder 45 or blue tooth module 60. The personalization data 22 is downloaded from the mobile device 46 to the vehicle 10 over a communication path 70. Mobile devices 46 tend to be personal items used by a single user, so mobile devices 46 can be useful for storing personalization data 22 for a vehicle 10. It is known in the art that vehicles have memory for storing personalization data, but when personalization data is stored in the vehicle, it is not readily transportable to another vehicle additionally it is an added cost to a vehicle to have extra memory storage of user's personal settings. By storing the personalization data 22 in mobile device 46, the personalization data 22 is readily downloaded to the vehicle 10, or any other vehicle the user may occupy. Additionally, having the vehicle control module 32 authenticate the key fob 40 before allowing the personal data 22 to be downloaded to the vehicle 10 from the mobile device 46 ensures a level of security to allow for added features like starting the engine by way of non-limiting example. The control module 32 is coupled to the vehicle NFC transponder 45 or blue tooth module 60 to input the received personalization data 22 and adapted to personalize vehicle devices to preferred settings in accordance with the received personalization data by adjusting the vehicle devices.

It can be appreciated that the personalization data 22, when prompted, is uploaded from the vehicle 10 to the cell phone 46. As used herein, uploading personalization data 22 includes when personalization data 22 is output by the vehicle control module 32, transferred to the vehicle NFC transponder 45 or blue tooth module 60, and transferred wirelessly and stored in mobile device memory 48, as illustrated in FIG. 2.

FIG. 2 is a block diagram depicting coupling between the control module 32 and adjustable devices including the seat 12, the mirror 28, the steering wheel 14, the brake pedal 16, the acceleration pedal 18, the HVAC 36, and the infotainment controller 38. The coupling may be supplied by wires or may be a communications bus where multiple vehicle devices communicate over the communications bus, the utilization of a media oriented system transport (MOST) driver or a controller area network bus could be used by way of non-limiting example. The arrow at each end of the lines depicting the coupling indicates that data is communicated in both directions. For example, data can be communicated from the control module 32 to the seat 12 for adjusting the position of the seat 12, or data can be communicated from the seat 12 to the control module 32 for indicating the present position of the seat 12. The control module 32 is also coupled to the vehicle NFC transponder 45 or blue tooth module 60 and the arrows at each end of the line depicting the coupling indicate that data is communicated or transferred from the vehicle NFC transponder 45 to the vehicle control module 32 and from the vehicle control module 32 to the vehicle NFC transponder 45, by way of non-limiting example. The vehicle control module 32 is also coupled to the power mode relay 79 and with the engine control module (ECM) 80, which can start and stop engine, through the ignition system 82. If the user wishes to start the vehicle 10, the control module will indicated to the power mode relay, which will prompt the ECM 80 to initiate the ignition system 82 of the vehicle 10. It is known in the art that the brake pedal 16 needs to be depressed in order for the engine (not shown) to be started, in a typical PEPS system, if the user does not press the brake pedal 16, but pushes the start/stop button (not shown) the power mode relay will not start the engine but will allow for the accessory electronics to function.

Figure 4:
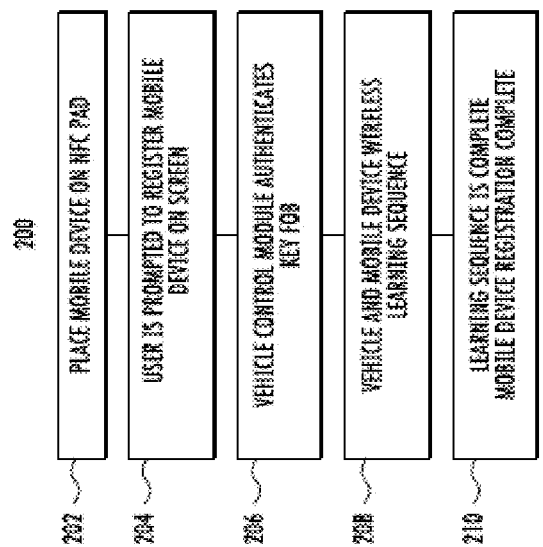
FIG. 4 is a flowchart of the operation of the system.

FIG. 4 shows flowchart 200 for registration of the cellphone with the vehicle. The system initiates when a user places the mobile device 46 on the NFC charging pad 56. This initiates step 204 which prompts the user, on the mobile device screen 72, to register the mobile device with this vehicle 10. If the user chooses to register this prompts the next step 206 in where the vehicle control module searches to authenticate the key fob 40 of the RKE system. If the user chooses not to register, the registration will stop at step 204. The next step 208 which initiates the communication or learning sequence with the mobile device 46, either by NFC or blue tooth or any other cipher encrypted wireless communication by way of non-limiting example. The process is complete, with step 210, when the cellphone and vehicle learning is complete.

Figure 5:
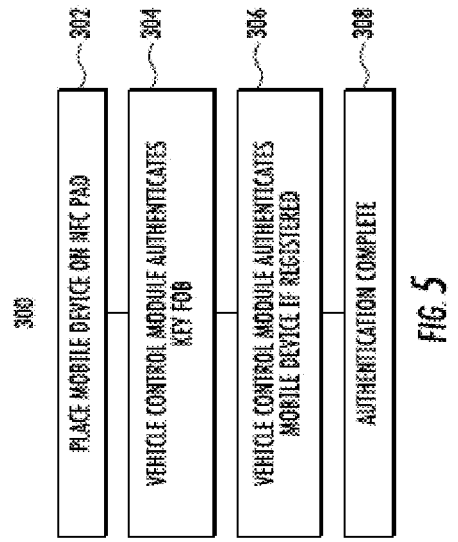
FIG. 5 is a flowchart of the operation of the system.

FIG. 5 shows flowchart 300, this describes authentication of the cell phone after initial registration is complete. This flowchart would be initiated in any subsequent uses of a particular vehicle. The process is started when the user places the cellphone on the NFC pad 56. Step 302, the vehicle control module wirelessly searches for the appropriate key fob of the RKE system, once that key fob is authenticated step 304 authenticates the mobile device. If this mobile device is registered previously, the mobile device is authenticated, 306 and communication can commence upon authentication complete, 308.

FIG. 6 shows flowchart 400 for the mobile device learning the various user preferences of the vehicle. Step 402 describes the mobile device on the wireless NFC pad 56. Step 404 is that the mobile device 46 is previously registered and authenticated, processes described in flow chart 200 and 300. The user initiates step 406 which is to stop the engine. The user is prompted on the mobile device screen to download the user preferences of the vehicle, step 408, for example seat position, steering wheel position, mirror positions, HVAC settings, and infotainment settings as shown in FIG. 2, by way of non-limiting example. Step 410 is the user accepting or denying the downloading of the user preferences. If the user chooses the affirmative, the vehicle control module 36 will send data through wireless communication to the mobile device, 412. The final step 414 is the mobile device 46 learning the user preferences and storing them in the internal memory 48 of the mobile device 46.

FIG. 7 shows flowchart 500 for starting the engine using the mobile device interface. The system operates by placing the mobile device on the NFC pad 56, step 502. Step 504 is that vehicle control module 32 determines the mobile device 46 is previously registered and authenticated with key fob 40, processes described in flow chart 200 and 300. Vehicle control module 32 determines if user applied the brake pedal 16, step 506, if so, step 508 is a pop up engine start button icon is displayed on the mobile device screen 72, if the user selects this button icon on the screen 72, step 510, the engine will start, step 512. If the user does not depress the brake pedal 16 the engine start prompt will not show up on the screen, additionally if the user does not select the engine start icon, the engine can be started by conventional ways known in the art, for example key in the ignition, push button on dash board by way of non-limiting example.

Figure 8:
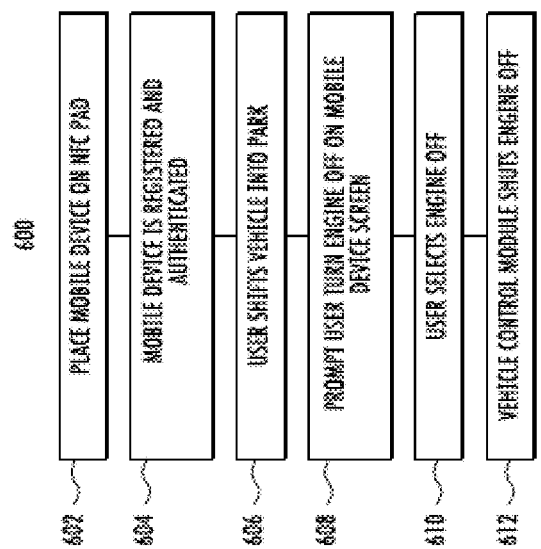
FIG. 8 is a flowchart of the operation of the system.

FIG. 8 shows flowchart 600 for turning the engine off using the mobile device. The mobile device 36 is on NFC pad 56 step 602, and has been registered and authenticated by previous processes 604. Step 606 is if the user shifts vehicle into park, if yes, step 608 will prompt on the mobile device screen 72 an icon to stop engine. If the user presses the icon, in step 610 the engine will shut off, step 612. If the user does not select the engine stop icon, the engine can be stopped by conventional ways known in the art, for example key in the ignition, push button on dash board by way of non-limiting example.

Figure 9:
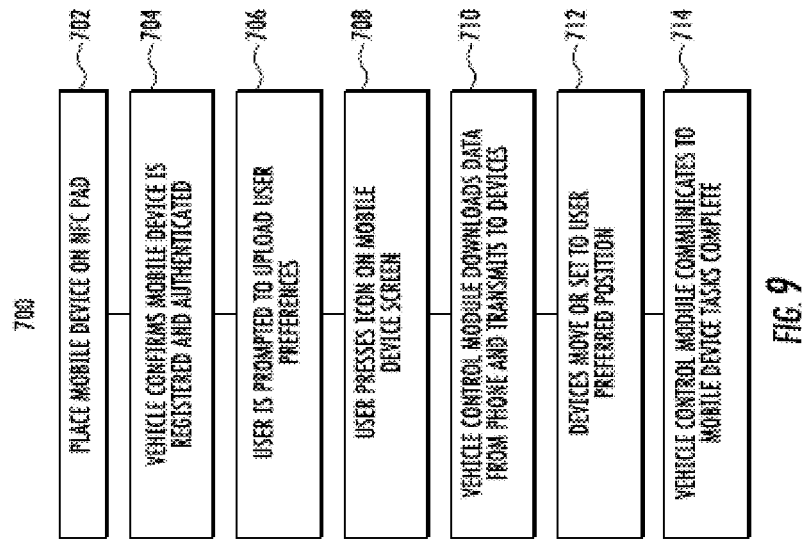
FIG. 9 is a flowchart of the operation of the system.

FIG. 9 shows flowchart 700 for the mobile device to request to move seat, steering, mirror and other user preferences that are stored. The first step 702 is for the user to place the mobile device 46 on the NFC pad 56 and then the vehicle control module 32 completes the authentication process, step 704. The user is prompted by the mobile device 46, by a button appearing on the mobile device screen 72 to upload preference data 22, which is step 706. Step 708, is the user presses user preferences prompt on mobile device screen 72. Mobile device 46 transmits wirelessly through NFC or Bluetooth as way of non-limiting example, user preference data 22. The vehicle control module 32 downloads data, the control module then communicates to each component that has been saved, for instance the seat 12, steering wheel 14, pedals 16 and 18, mirrors 28, HVAC settings 36, infotainment settings 38, step 710. The devices move to desired position, step 712. Once the vehicle control module 32 determines all components have completed moving, step 714 is the vehicle control module 32 communicates wirelessly to the mobile device 46 completion of the tasks.

Figure 10:
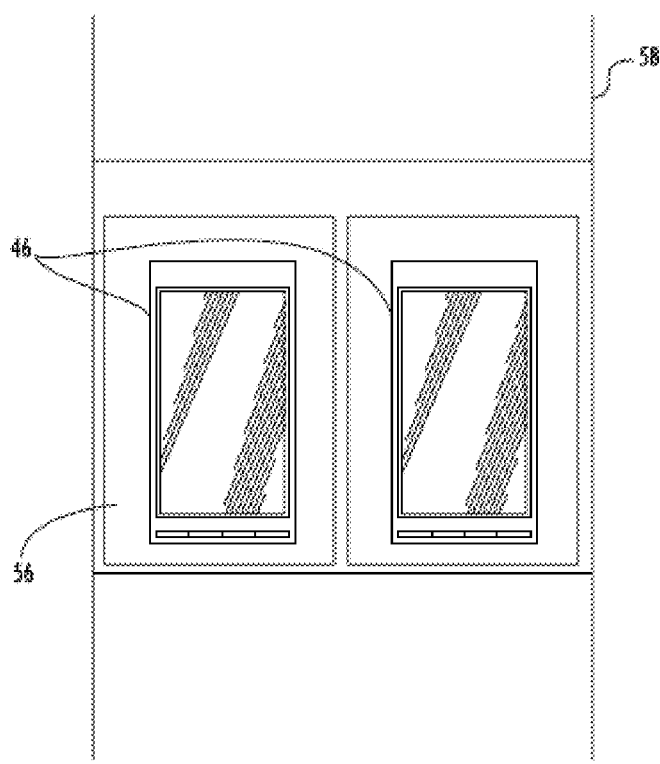
FIG. 10 is a close up view of the center console and two mobile devices.

Additionally, the same steps can be taken for a passenger in the vehicle to adjust user preferences and have the configurations saved. FIG. 10 displays 2 mobile devices 46 on the NFC pad 56; the system may be capable to communicate with two devices and allow two users to customize seat settings, HVAC settings by way of non-limiting example.

Alternately, the vehicle personalization system could be put in a commercial delivery truck, a construction vehicle or an aircraft, whereby the personalization data would include data for any device in the vehicles listed that can be adjusted to correspond to a preference of the user.

While this invention has been described in terms of the preferred embodiments thereof, it is not intended to be so limited, but rather only to the extent set forth in the claims that follow.

What is claimed is:

1. A vehicle operation system comprising:
   a vehicle having an ignition system, a control module, a first wireless transponder, and a remote keyless entry antenna wherein the control module is coupled to the ignition system, the first wireless transponder and a remote keyless entry antenna;
   a key fob, wherein the key fob and remote keyless entry antenna communicate wirelessly to authenticate the key fob to the vehicle;
   a mobile device having a memory for storing user preference data, a second wireless transponder coupled to the memory, the first wireless transponder configured to communicate with the second wireless transponder; wherein the mobile device is configured to communicate with the control module through the first wireless transponder once the key fob is authenticated to the vehicle, said control module transmitting at least one vehicle user setting to the mobile device through said first wireless transponder to be stored in the mobile device memory when the ignition system is turned off.

2. The vehicle operation system according to claim 1, wherein, once key fob is authenticated the mobile device communicates with the ignition system through the control module.

3. The vehicle operation system according to claim 1, wherein the mobile device contains a battery.

4. The vehicle operation system according to claim 1, wherein the wireless communication between the first and second transponder is performed using near field communication.

5. The vehicle operation system according to claim 4, wherein the near field communication wirelessly charges the battery of the mobile device through a near field communication pad.

6. The vehicle operation system according to claim 1, wherein the wireless communication between the first and second transponder is performed blue tooth wireless communication.

7. The vehicle operation system according to claim 1, wherein the user setting comprises adjustable features of the vehicle that are set by a user.

8. The vehicle operation system according to claim 7, wherein the adjustable features comprises at least one of a driver seat, a passenger seat, a HVAC system, a infotainment system, a brake pedal, an accelerator pedal, a side view mirror.

9. The vehicle operation system according to claim 1, further comprising the user settings stored in the mobile device can be communicated wirelessly to the vehicle control module from the mobile device.

10. A operation system comprising:
    a vehicle;
    a ignition system;
    a passenger cabin in the vehicle;
    a control module in the vehicle;
    a first antenna for wirelessly receiving and transmitting data;
    a second antenna for wirelessly receiving and transmitting data with a key fob; and
    a mobile device wherein the mobile device has a third antenna for wirelessly receiving and transmitting data; a memory for storing data, the third antenna and memory are electronically linked, the first antenna, second antenna and ignition system are coupled to the control module, wherein the first antenna and third antenna communicate wirelessly, the mobile device communicates to the control module to start the ignition system after the control module authenticates the key fob and mobile device.

11. The operation system comprising according to claim 10, wherein the control module transmits user specific data to the memory of the mobile device.

12. The operation system comprising according to claim 11, wherein the transmission of user specific data occurs when the ignition system is shut off.

13. The operation system comprising according to claim 11, wherein the mobile device wirelessly transmits user specific data to the control module once the key fob is authenticated.

14. The operation system comprising according to claim 10, wherein the wireless communication between the first and third antenna is of near field communication technology.

15. The operation system comprising according to claim 10, wherein the wireless communication between the first and third antenna is of blue tooth technology.

16. The operation system comprising according to claim 10, wherein the mobile device further comprises a user interface screen, the interface screen displaying; an engine start icon on the screen when the vehicle ignition is off, an engine stop icon when the vehicle ignition is on.

17. The operation system according to claim 10, wherein the vehicle further comprises at least one user setting stored in the control module, the control module is electronically connected to adjustable features of the vehicle.

18. The vehicle operation system according to claim 17, wherein the adjustable features comprises at least one of a driver seat, a passenger seat, a HVAC system, a infotainment system, a brake pedal, an accelerator pedal, a side view mirror.

19. The vehicle operation system according to claim 11, further comprising;
    a passenger cabin in the vehicle;
    a console in the passenger cabin of the vehicle;
    a near field communication pad on the console; wherein the mobile device has a battery, the near field communication pad wirelessly charges the mobile device battery.

20. A vehicle control system comprising:
    a vehicle;
    a ignition system;
    a passenger cabin in the vehicle;

a control module in the vehicle;
a first antenna for wirelessly receiving and transmitting data;
a near field communication pad in the vehicle;
a second antenna for wirelessly receiving and transmitting data with a key fob; and
a cell phone wherein the cell phone has a third antenna for wirelessly receiving and transmitting data; a memory for storing data, the third antenna and memory are electronically coupled, the first antenna, second antenna and ignition system are coupled to the control module, the first antenna and third antenna communicate wirelessly, the cell phone communicates to the control module to start and stop the ignition system.

* * * * *